United States Patent

Wintrich et al.

[11] Patent Number: 6,059,194
[45] Date of Patent: May 9, 2000

[54] METHOD TO CONTROL THERMAL PROCESSES

[75] Inventors: Franz Wintrich, Essen; Dieter Kaiser, Dortmund; Hartmut Wintrich, Essen, all of Germany

[73] Assignee: Orfeus Combustion Engineering GmbH, Germany

[21] Appl. No.: 08/584,096

[22] Filed: Jan. 11, 1996

Related U.S. Application Data

[63] Continuation of application No. 08/209,532, Mar. 10, 1994, abandoned.

[30] Foreign Application Priority Data

Mar. 13, 1993 [DE] Germany .................. 43 08 055

[51] Int. Cl.[7] .................. G05D 15/00; B09B 3/00
[52] U.S. Cl. .................. 236/15 BD; 110/235; 236/78 D; 431/18; 706/4
[58] Field of Search .................. 236/15 BD, 78 D; 431/18; 110/235; 706/3, 4

[56] References Cited

U.S. PATENT DOCUMENTS

| | | | |
|---|---|---|---|
| 4,676,734 | 6/1987 | Foley | 236/15 BD |
| 4,749,122 | 6/1988 | Shriver et al. | 236/14 |
| 5,280,756 | 1/1994 | Labbe | 236/15 BD |
| 5,557,939 | 9/1996 | Mizukami et al. | 236/78 D |

*Primary Examiner*—William Wayner
*Attorney, Agent, or Firm*—Connolly Bove Lodge & Hutz

[57] ABSTRACT

The present invention relates to a method for controlling thermal processes, whereby measuring devices measure at least two process parameters at least once within a time interval in which a parameter change occurs that is not negligible for the process sequence, the recorded parameters are fed into a control unit, and the control unit regulates the process parameters in the thermal process by means of quantities obtained from the measurements of process parameters.

11 Claims, 2 Drawing Sheets

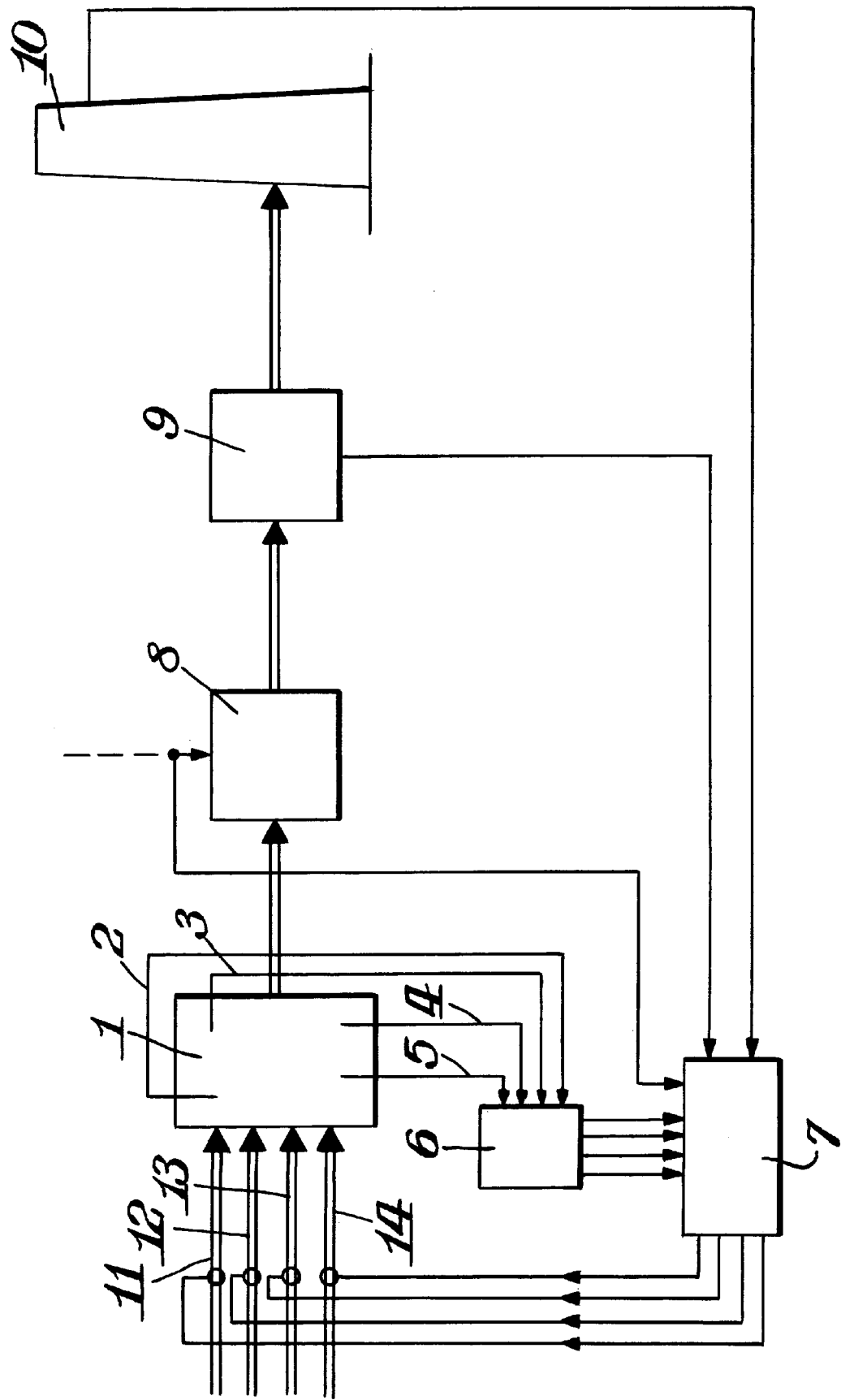

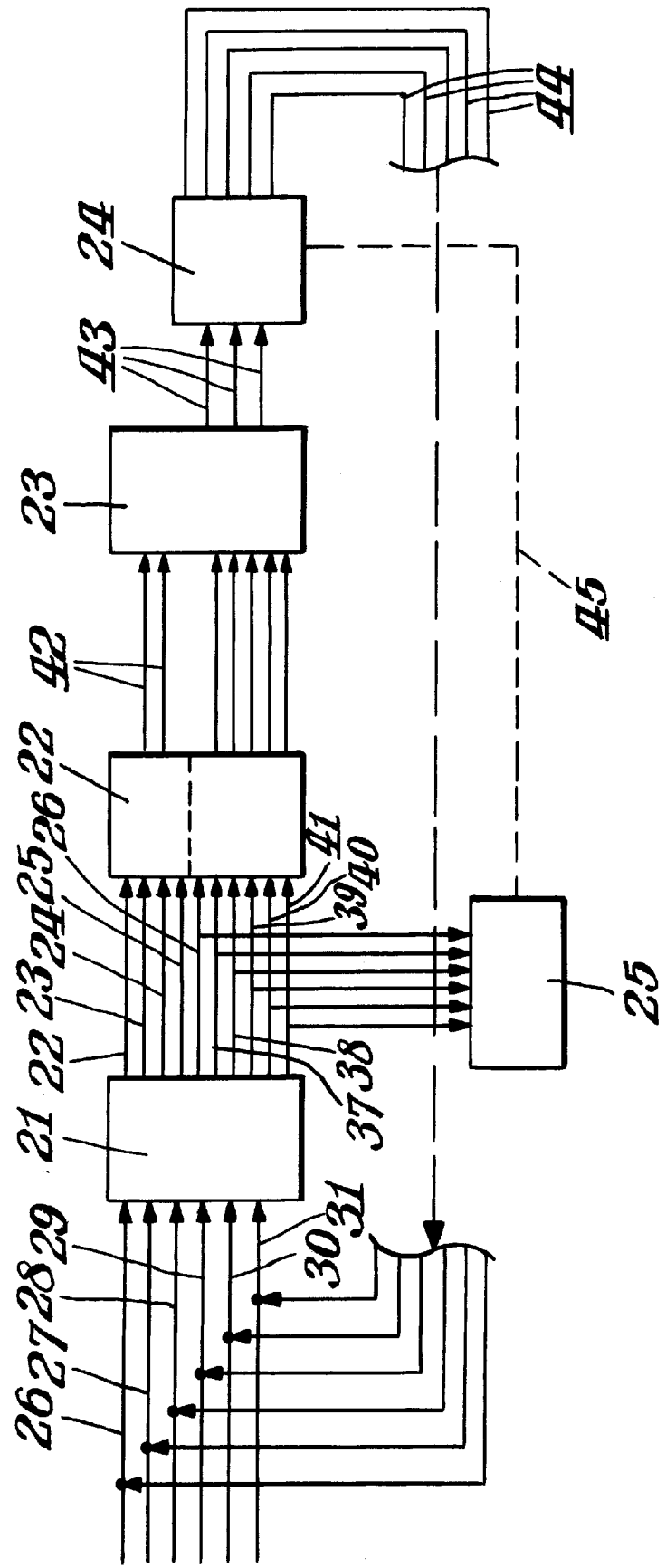

METHOD TO CONTROL THERMAL PROCESSES

This application is a continuation of application Ser. No. 08/209,532, filed on Mar. 10, 1994 now abandoned.

The present invention relates to a method for controlling thermal processes by measuring at least two process parameters in a discrete time interval, by determination of a situation actual value obtained from measuring data in a controlling system, comparing the situation actual values with specified reference values, and using the reference differential values for controlling the thermal process by regulating the process parameters.

The control of thermal processes is of very great importance especially in view of emissions such as $NO_x$, 2,3,7,8 TCDD, dibenzofurane emission or dust formation.

Thermal processes do not mean only combustion processes as for instance in power plants in which fossil fuels, refuse, sewage sludge, hazardous waste and the like are burned, but also autothermic gasifications in which materials containing carbon as for instance the above mentioned materials and, at present, foremost residual oil resulting from crude processing are converted by means of steam. Since gasifications occur at temperatures up to 2,000° C., a part of the material charge will be burned in order to maintain the temperature required for the endothermic conversion of materials containing carbon by means of steam.

In more liberal meaning, thermal processes are for instance also the generation of certain products such as acetylene in arcing, the production of olefins by application of the so-called steam cracking method, or slag production in processes generating slag. The thermal processes cited above are given by way of example. Other thermal processes are familiar with those skilled in the art.

According to the state of the art individual process parameters are recorded and separately evaluated for the control of such processes. The individual input quantities are regulated to a large extent independently by comparing actual with set values.

Examples for important process parameters:

Temperature, radicals formed and radical concentrations, dust load on the process, process emissions, efficiency of flue gas cleaning, efficiency of electrostatic filters, waste water contaminations, waste water quantity, pH-value in a scrubber, steam quantity produced by an eventually available steam generator, and other parameters depending on the process type.

Since the temperature represents an important characteristic feature of thermal processes, measuring methods according to the state of the art will briefly be described in the following:

With a method operating with a suction pyrometer for instance, a cooled lance is inserted through the sight hole of a reactor in a reaction space, and then the temperature of a sucked off gas quantity determined. Only one individual, local temperature will be measured at the time.

Contactless methods for the determination of temperatures in thermal processes are also known. For contactless temperature determination for instance in the combustion chamber of a coal-fired power plant, it has been proposed to arrange numerous acoustic source detector units in a plane outside of the wall surrounding the combustion chamber. With the application of this method a source detector unit transmits a momentary acoustic signal, e.g. a bang, which is received by specified other source detector units. Transmitting and receiving acoustic signals can be evaluated by determining the momentary density of combustion gases and concluding therefrom a definite temperature Another parameter known according to EP-A-0317731 is important for the determination of radicals generated in thermal processes, e.g. in order to control refuse incineration processes.

The type and concentration of radicals in individual process steps provide essential features of processes forming radicals and basic factors for evaluation and control of such processes. Hereby, the verification of $NO_x$ production is of special importance. The type of radicals and the concentration of which can be determined by picking-up radiations mainly in the UV range. Radicals transmit a characteristic band radiation in specific wave ranges, from the intensity of which the radical concentration may be concluded.

The radiation of solid matter such as dust can also be determined by measuring the radiation spectrum. Compared with radiation of individual molecules, however, particle radiation is to a large extent a band-free body radiation.

The numerous measuring methods used to determine other process parameters will not be discussed in further detail since they are quoted in the state of the art and those skilled in the art are familiar with such methods.

Although the measurement of individual parameters permits to make partial statements on a specific actual condition of a thermal process, so that such parameters can be controlled by means of regulating the input quantities, up to now no one has succeeded in representing the whole situation of the thermal process and in regulating the process as a whole by determining a plurality of important process parameters in a specified time interval.

Starting from this problem definition, the applicant has now succeeded in determining the actual condition of a thermal process on the desired scale, and in controlling the process input quantities and with them the process parameters in such a way that an optimal process sequence is achieved by a method for controlling such thermal processes, characterized in that at least two process parameters are measured by means of measuring devices at least once within a time interval, in which a parameter change occurs that is not negligible, and in that the recorded parameters are fed to a control unit, and the control unit regulates the process parameters in the thermal process with quantities obtained from the measurement of process parameters.

The FIGS. 1 and 2 show different embodiments including a refuse incineration plant and a power station each with a regulation system according to the invention.

According to the invention, the period in which two and more parameters respectively are measured is of great importance.

When selecting a sufficiently short time interval, any parameter changes that are not negligible will be determined in this way. An individual parameter can be measured several times within such a period. According to the invention, however, at least two or more parameters different from each other are also measured within the same time interval. It is obvious that the parameter with the shortest time interval, in which a not negligible change occurs, is particularly important since parameters with longer time intervals do not change within the shortest time interval, and therefore can be allocated to the parameter with the shortest time interval.

The control unit according to the invention includes preferably a classificatory in which a plurality of measured data will be entered in order to be classified. Hereby, the classificator consolidates the parameters, which are simultaneously recorded in discrete time intervals, to individual classes. These may be for instance temperature distribution, concentration of radical groups, and the local dust load on zones of a combustion chamber. In addition other data determined in other steps, e.g. from steam generator, flue gas cleaning or waste gas analysis, can be fed into the classificator for corresponding consolidation. The process parameters consolidated into classes in such a way are summarized in a situation actual value, so that the plurality of recorded process parameters can be qualified by a value which represents a situation in the combustion chamber since it is determined and classified in a time interval. A correlator available in the control unit compares this value with a total set value obtained from a reference unit and establishes a correlation and deviation respectively or an accordance. Depending on deviation or accordance, regulating strategies can now be elaborated in order to regulate input quantities. According to the invention it is also possible to separately treat defined groups of process parameters, e.g. local process parameters and analysis values from flue gas cleaning, aside from other groups, thus permitting to obtain two or more situation actual values and to compare the latter with the total set value established for the defined group. Regulating interventions can be derived from this comparison. The control unit according to the invention comprises in addition a memory library in which set measured quantities are memorized that can be compared with situation actual values.

The method provided represents accordingly the entire situation of the thermal process since a plurality of important process parameters can be entered simultaneously into the control unit and treated according to the invention, thus permitting to control the process as a whole.

The discrete time intervals, in which parameters are measured, have to be to begin with be determined empirically.

The invention will now be described by way of example with reference to FIGS. 1 and 2 which illustrate different embodiments of the present invention. Hereby, it should be taken into consideration that the combustion process has been selected as typical thermal process for detailed representation which, however, should not be interpreted as a limitation of the present invention since the method for process control according to the invention can analogously be applied to other thermal processes.

FIG. 1 shows the boiler (1) of a refuse incineration plant. The measuring units (2) to (5) measure defined parameters in boiler zones such as concentrations of radicals, temperatures or dust loads. The measured data get via (6) into the control unit (7) which comprises a classificator, a correlator, a reference unit and a memory library.

The controller can receive additional measuring data which relate to the water quantity added in a steam generator (8), the pH-value in a scrubber and the separating capacity of an electrostatic filter, whereby scrubber and electrostatic filter are components of the flue gas cleaning unit (9). Measuring values finally get into the control unit via emissions in the cleaned flue gas such as $SO_2$, $NO_x$, CO and $CO_2$ from (10).

Input quantities (11) to (14) are controlled by comparing the situation actual value with the situation set value memorized in the memory library.

FIG. 2 shows the control unit of a large firing place such as a power station in connection with the measured data.

Various input quantities (26) to (31), for the regulation of which individual parameters are determined, are entered into the combustion chamber (21). This relates to local parameters such as concentration of radicals, temperature distribution, dust loads, flue gas analyses as well as to ratings of other units. Now a plurality of data (32) to (41) enters the classificator (22) for classification. Hereby, the classificator consolidates the parameters simultaneously received in discrete time intervals to individual classes. The parameters may be measured for instance in zones of a combustion chamber for groups of radicals (32) to (34) with simultaneous consolidation of the temperature distribution (35) as well as of the local dust load (40). The data measured and determined respectively in other steps such as from steam generator (41), flue gas cleaning unit or flue gas analyses (36) to (39) enter the classificator in addition in order to be consolidated correspondingly. The process parameters (42) consolidated in such a way are now classified in classes and summarized in a situation actual value, so that the plurality of recorded process parameters is characterized by a value which represents a situation in a combustion chamber because it has been determined and classified within a time interval. The correlator compares this value (43) with a total set value obtained from a reference unit (24), and establishes a correlation and deviation respectively, or an accordance by means of comparison of the actual data with memorized data of the memory library. Depending on deviation or accordance regulation strategies can be developed in order to regulate input quantities or actuating signals (44). It is also possible to separately treat defined groups of process parameters, such as local process parameters and analysis values from flue gas cleaning, as well as other steps, so that 2 or 3 situation actual values (43) appear that can be compared with the total set value established for the defined group and regulating interventions can be derived from such comparison. The control unit comprises in addition a memory library (25) in which data from the determined process parameters are entered. The memory library is available for initial learning processes and later verifications by means of the reference unit (45).

The method according to the invention permits consequently to represent an entire situation of the combustion process, and particularly to enter a plurality of important process parameters in a control unit within the same period, thus allowing to regulate the process as a whole.

We claim:

1. A method to control thermal processes, characterized in that measuring devices measure at least two process parameters at least once within a time interval in which a parameter change occurs that affects the process sequence, the time interval exceeding the shortest time interval within which a change of a process parameter occurs, and in that the shortest time interval within which a change of a process parameter occurs is empirically determined, in that the recorded process parameters are fed into a control unit, the control unit regulating the process parameters in the thermal process by means of quantities obtained from process parameter measurements, in that the control unit comprises a classificator which consolidates the parameters measured in a time interval to classes and summarizes them in situation actual values, in that the control unit comprises a correlator which correlates the situation actual values summarized in the classificator with situation set values, and in that input quantities are regulated by means of reference values obtained from the correlation of the situation actual values and the situation set values.

2. A method according to claim 1, characterized in that groups of process parameters are summarized in separate situation actual values, and in that the latter are correlated in the correlator with situation set values corresponding with the defined group.

3. A method according to claim 1, characterized in that the position of measuring devices is adjusted in dependence on measured parameter data.

4. A method according to claim 1, characterized in that the concentration of radicals in discrete ranges of the thermal process is measured as parameter.

5. A method according to claim 1, characterized in that the temperature in discrete ranges of the thermal process is measured as parameter.

6. A method according to claim 1, characterized in that the dust concentration in discrete ranges of the thermal process is measured as parameter.

7. A method according to claim 1, characterized in that the thermal process is a combustion process.

8. A method according to claim 1, characterized in that the thermal process is a gasification process.

9. A facility to control thermal processes according to the method under claim 1, characterized in that the facility comprises devices for measuring process parameters in defined time intervals, and a control unit which compares situation actual values with situation set values and regulates process parameters with the aid of comparison values.

10. A facility according to claim 9, characterized in that the control unit comprises a classificator.

11. A facility according to claim 9, characterized in that the control unit comprises a correlator.

* * * * *